US012072086B1

(12) United States Patent
Xu et al.

(10) Patent No.: US 12,072,086 B1
(45) Date of Patent: Aug. 27, 2024

(54) LED LAMP

(71) Applicant: SHENZHEN SNC OPTO ELECTRONIC CO., LTD, Shenzhen (CN)

(72) Inventors: Jianyong Xu, Shenzhen (CN); Yuqiang Zhong, Shenzhen (CN)

(73) Assignee: SHENZHEN SNC OPTO ELECTRONIC CO., LTD, Shenzhen (CN)

(*) Notice: Subject to any disclaimer, the term of this patent is extended or adjusted under 35 U.S.C. 154(b) by 0 days.

(21) Appl. No.: 18/537,309

(22) Filed: Dec. 12, 2023

(30) Foreign Application Priority Data

Jun. 14, 2023 (CN) ......................... 202310704450.8

(51) Int. Cl.
*F21V 29/76* (2015.01)
*F21V 19/02* (2006.01)
*F21Y 105/16* (2016.01)
*F21Y 115/10* (2016.01)

(52) U.S. Cl.
CPC ............ *F21V 29/763* (2015.01); *F21V 19/02* (2013.01); *F21Y 2105/16* (2016.08); *F21Y 2115/10* (2016.08)

(58) Field of Classification Search
CPC ........ F21V 29/763; F21V 19/02; F21V 14/02; F21V 14/06; F21V 14/065; F21V 14/08; F21V 14/085; F21V 14/00; F21V 29/503; F21V 29/504; F21V 29/506; F21V 29/70; F21Y 2105/16; F21Y 2115/10
See application file for complete search history.

(56) References Cited

U.S. PATENT DOCUMENTS

2009/0237924 A1* 9/2009 Ladewig ................. F21V 14/02 362/231
2013/0170222 A1* 7/2013 Lin ......................... F21V 14/06 362/308
2016/0215961 A1* 7/2016 Kjeldsen ................. F21V 13/02
2016/0334079 A1* 11/2016 Donnini ................ F21V 17/102
2017/0268748 A1* 9/2017 Jorgensen .............. H05B 45/00
2017/0269292 A1* 9/2017 Jurik ........................ F21V 14/04
2019/0360665 A1* 11/2019 Latteo .................... G03B 21/14

* cited by examiner

*Primary Examiner* — Bao Q Truong

(57) ABSTRACT

An LED lamp includes a heat sink with a first groove arranged on a front surface thereof for receiving an LED light board therein, a first transparent plate, a movable member installed on the heat sink and driving the first transparent plate to move relative to the LED light board, to adjust a distance between the LED light board and the first transparent plate. The movable member includes a rotation shaft, and a moving member connected to the rotation shaft by a transmission way, arranged on a side of the first transparent plate near the first groove and connected to the first transparent plate. The rotation shaft defines a screw thread and the moving member defines a threaded hole, so that the rotation shaft is inserted into the moving member to drive the moving member to stretch out and draw back by engaging the screw thread with the threaded hole.

13 Claims, 8 Drawing Sheets

LED LAMP

CROSS-REFERENCE TO RELATED APPLICATION

This application claims the benefit of priority from Chinese Patent Application No. 202310704450.8 entitled "LED LAMP" and filed on Jun. 14, 2022, the content of which is hereby incorporated by reference in its entire by reference.

TECHNICAL FIELD

The present disclosure generally relates to the field of lighting devices, and especially relates to an LED lamp.

BACKGROUND

An LED lamp with a plurality of advantages such as energy conservation, environmental protection and a long lifespan, has been widely used in various lighting places. A conventional LED lamp generally includes a lens plate that is fixed, so that positions of the lens plate are not possible to be movably adjusted according to requirements of different usage conditions, thereby result in being unable to adjust distribution directions of light emitted from the LED lamp. Therefore, it is necessary to design a new LED lamp to solve the above problem.

SUMMARY

The technical problems to be solved: in view of the shortcomings of the related art, the present disclosure provides an LED lamp which can adjust distribution directions of light emitted from the LED lamp.

An LED lamp according to an embodiment of the present disclosure includes: a heat sink, an LED light board and a first transparent plate, the heat sink defining a first groove arranged on a front surface thereof, the LED light board fixed in the first groove, and the first transparent plate arranged on a side of an emitting surface of the LED light board; the LED lamp including a movable member installed on the heat sink and connected to the first transparent plate by a transmission way, the movable member configured to drive the first transparent plate to move relative to the LED light board, so as to adjust a distance between the LED light board and the first transparent plate; and wherein the movable member includes a rotation shaft and a moving member connected to the rotation shaft by a transmission way, the moving member arranged on a side of the first transparent plate near the first groove and connected to the first transparent plate; wherein the rotation shaft defines a screw thread and the moving member defines a threaded hole, so that the rotation shaft is inserted into the moving member to drive the moving member to stretch out and draw back by engaging the screw thread with the threaded hole.

The present disclosure provides the advantages as below: the present disclosure can conveniently adjust positions of the first transparent plate (i.e. a lens plate), according to requirements of different usage conditions, to further adjust distribution directions of light emitted from the LED lamp, which can adjust the distribution directions of light emitted from the LED lamp without needing to disassemble the LED lamp, and have a simple and convenient operation thereof.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:

10 heat sink, 11 front surface, 12 first groove, 121 first bottom wall, 13 shaft hole, 14 back surface, 15 second groove, 16 third groove, 161 second bottom wall, 17 receiving room, 18 gear groove, 19 limiting groove, 20 LED light board, 21 emitting surface, 30 first transparent plate, 40 movable member, 41 rotation shaft, 411 screw thread, 412 gear portion, 413 part, 42 moving member, 421 threaded hole, 422 connecting arm, 4221 horizontal portion, 4222 vertical portion, 423 guiding portion, 43 fixing member, 431 guiding groove, 44 elastic rod, 441 horizontal rod, 442 vertical rod, 443 one end, 444 the other end, 50 knob, 60 second transparent plate, 70 power supply, 80 sealing ring.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Figure 1:
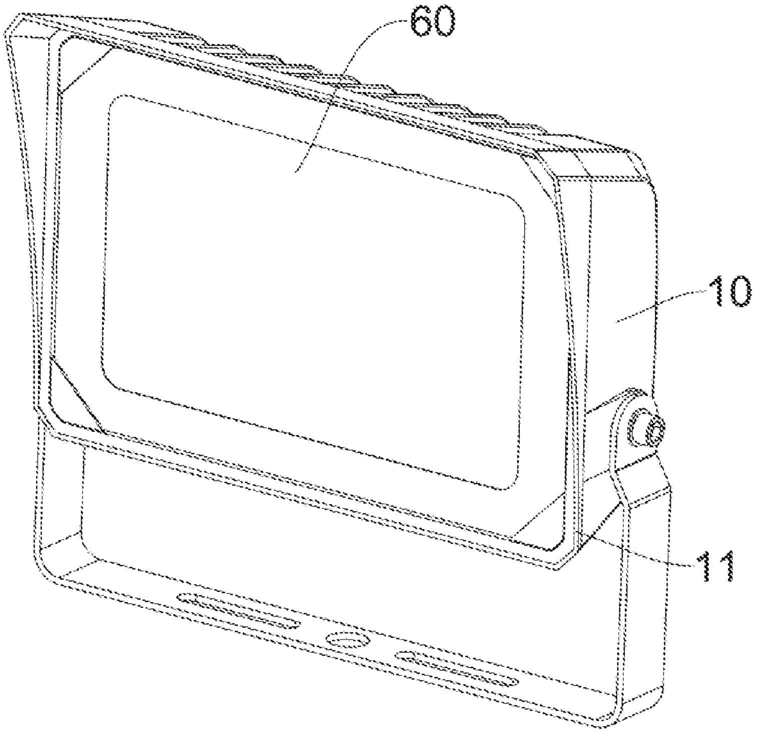
FIG. 1 is a schematic view of an LED lamp in accordance with an embodiment of the present disclosure.
Figure 2:
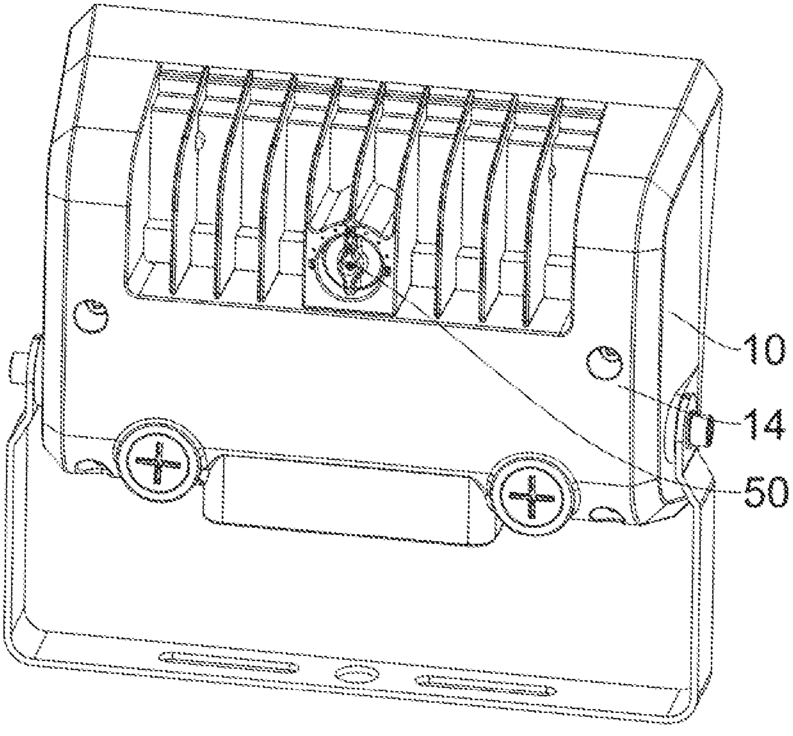
FIG. 2 is similar to FIG. 1, but shown from another view.
Figure 3:
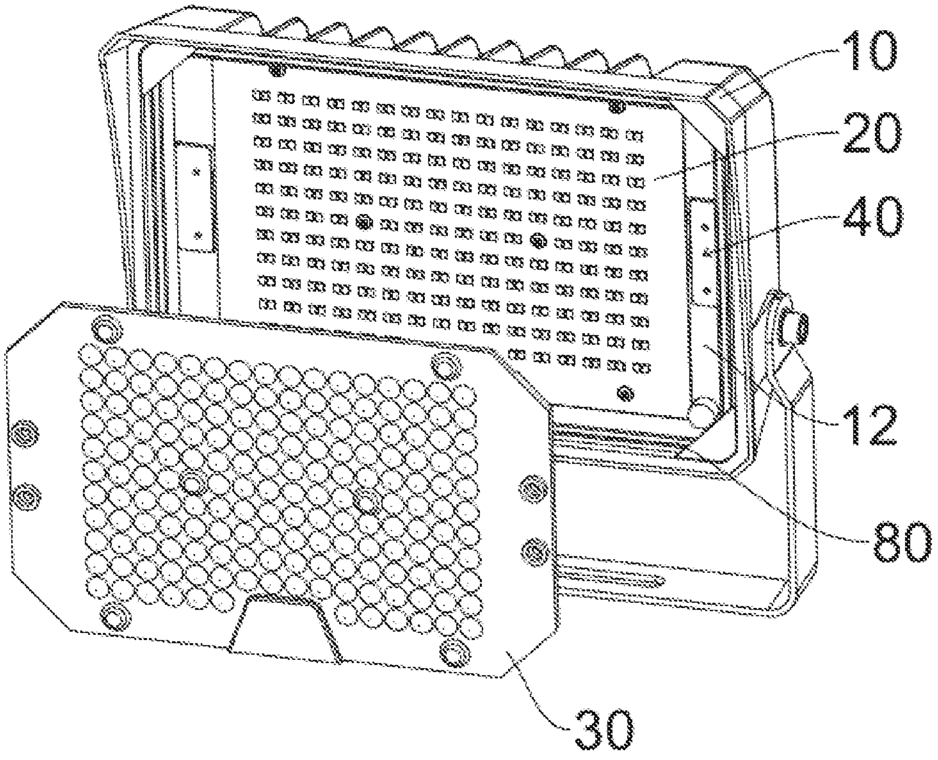
FIG. 3 is an exploded, schematic view of the LED lamp of FIG. 1.
Figure 4:
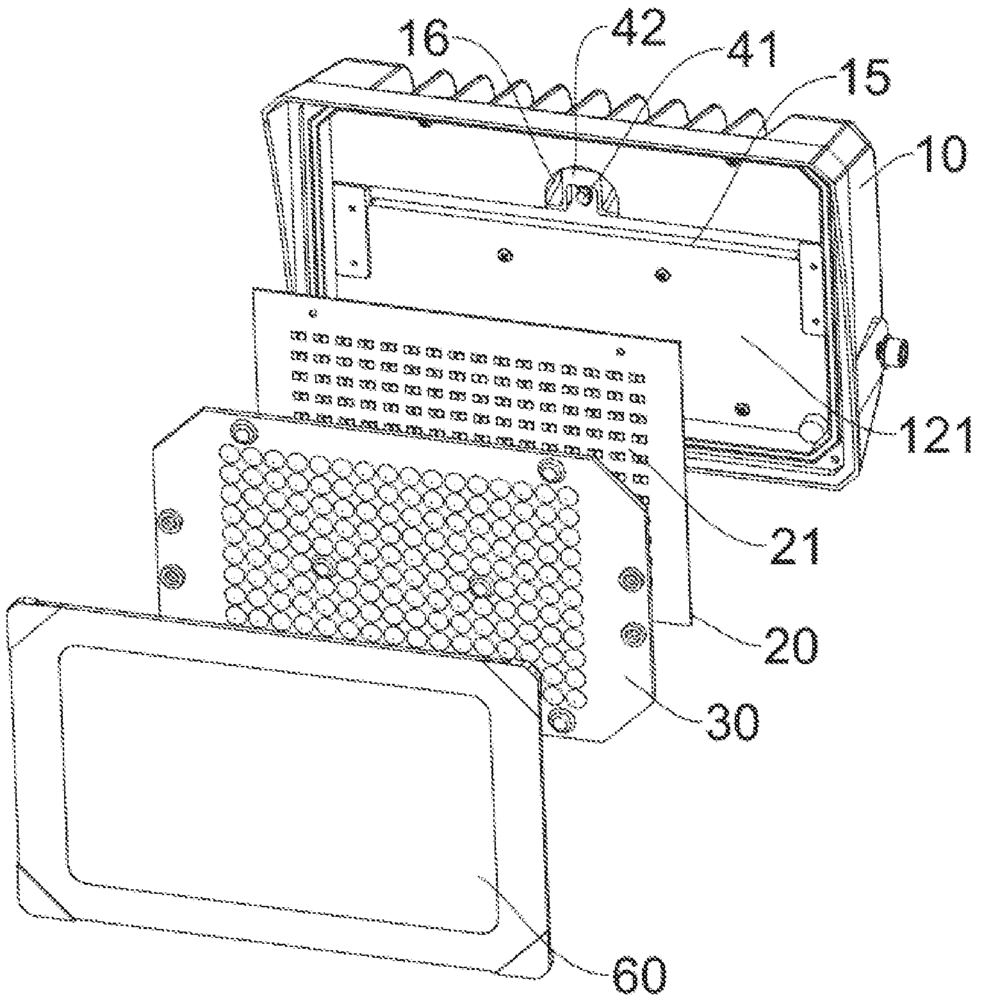
FIG. 4 is similar to FIG. 3, but shown from another view.
Figure 5:
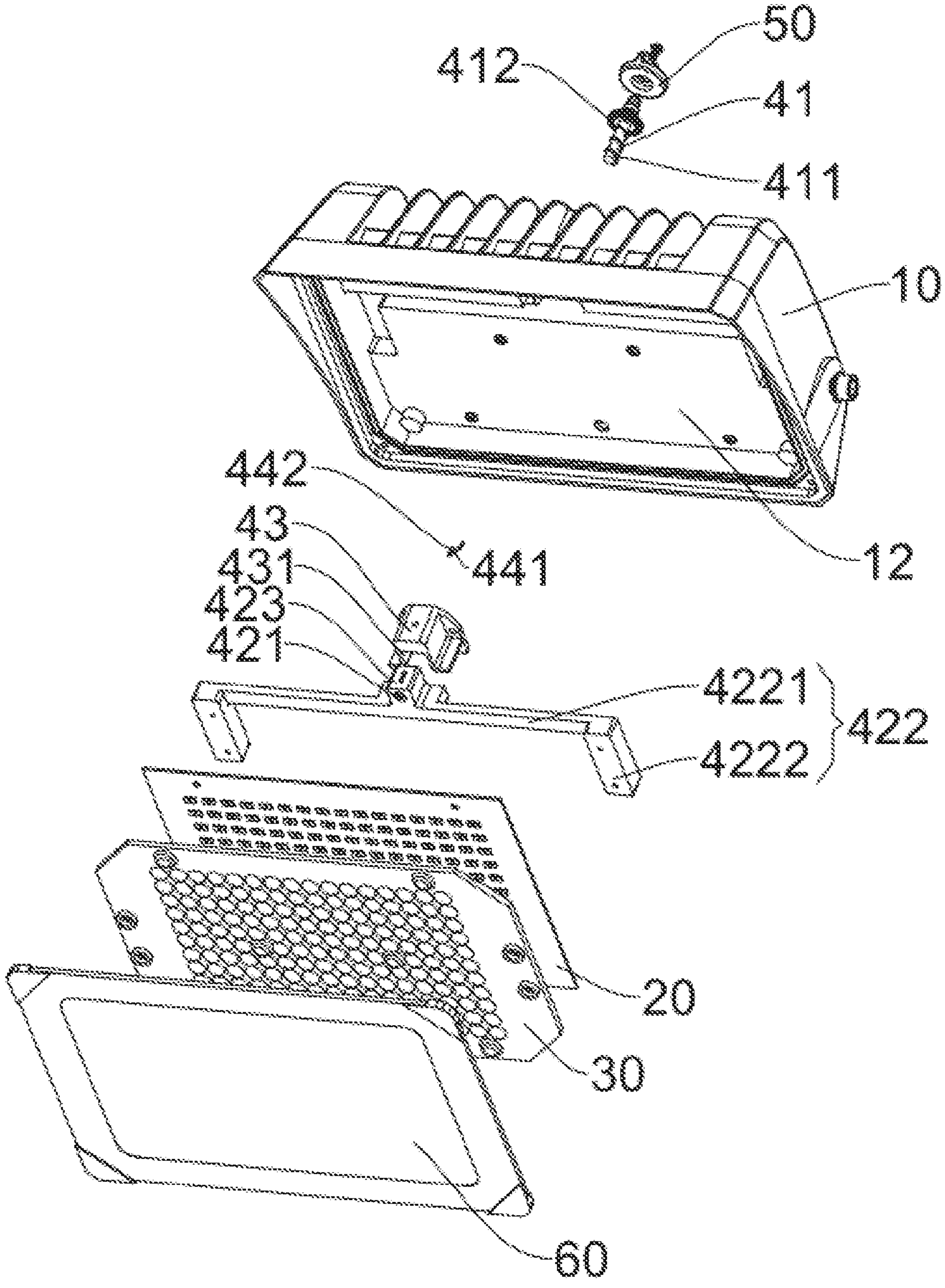
FIG. 5 is similar to FIG. 4, but shown from another view.
Figure 6:
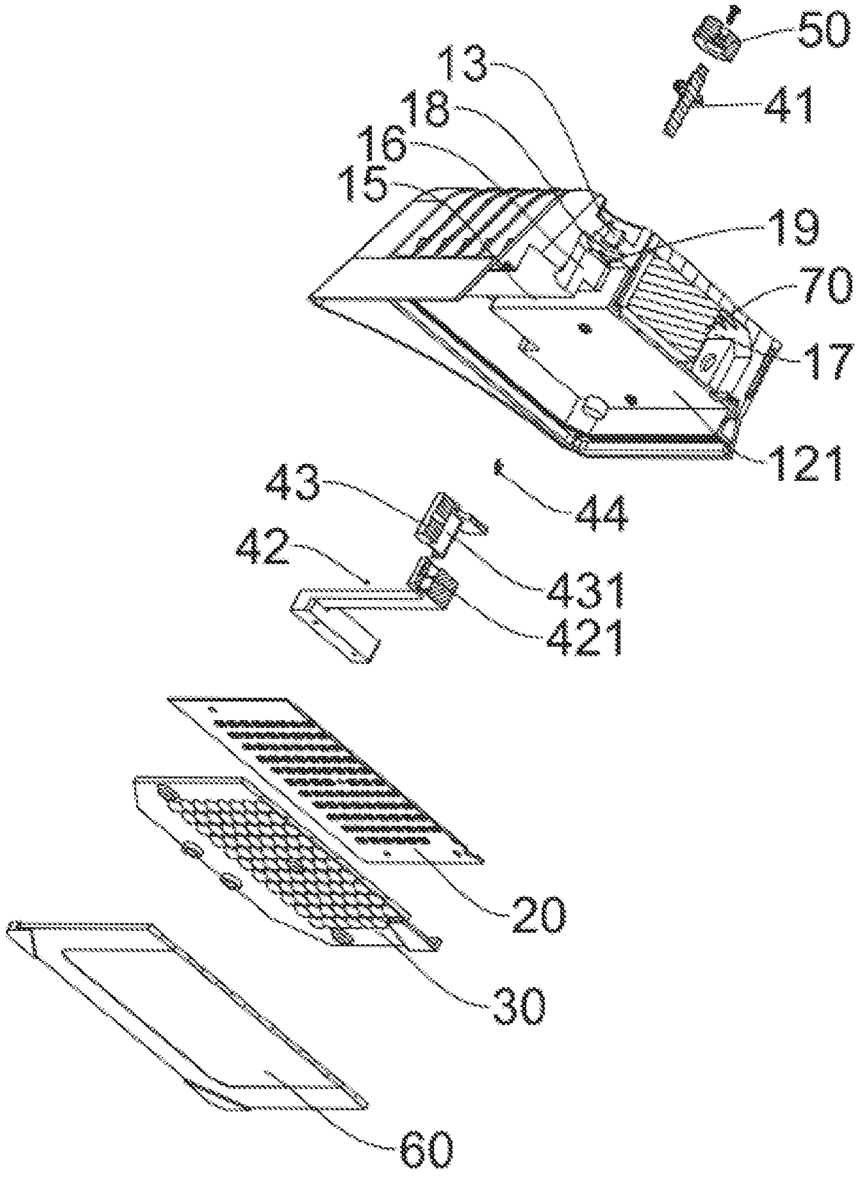
FIG. 6 is an exploded, cross sectional view of the LED lamp of FIG. 1.
Figure 7:
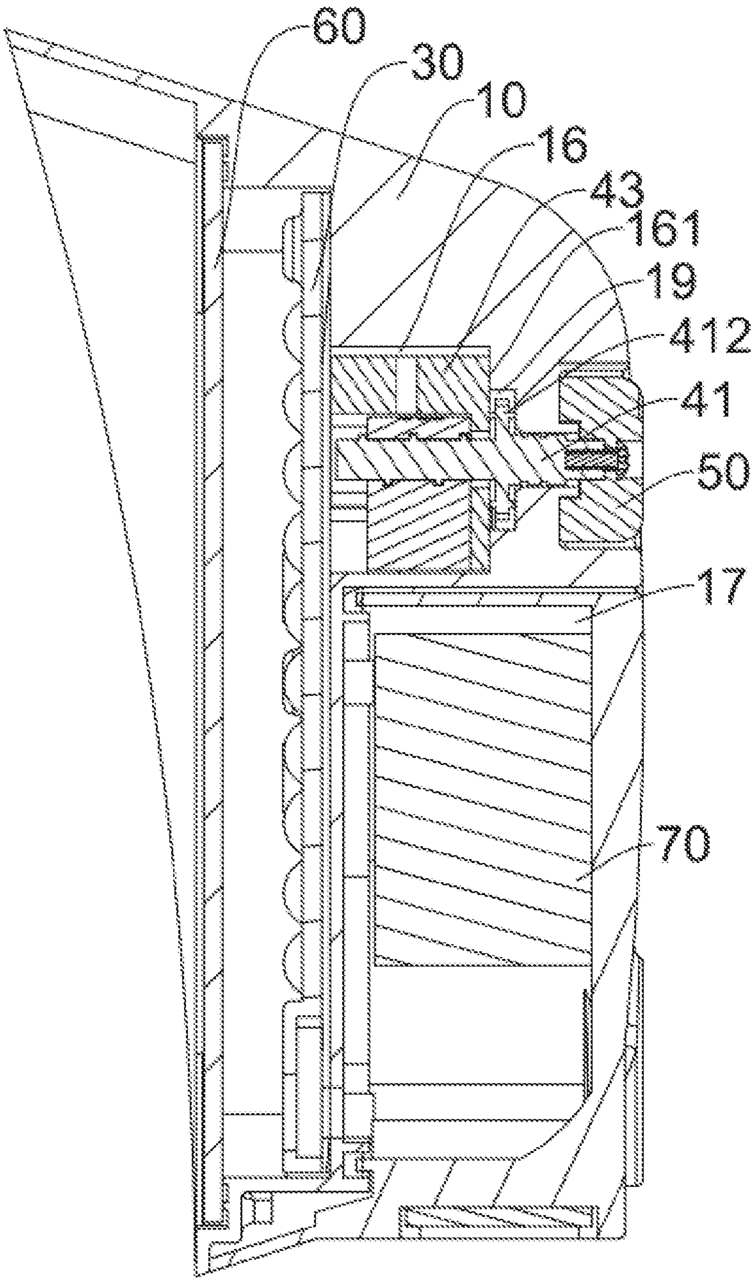
FIG. 7 is a cross sectional view of a movable member and a first transparent plate of the LED lamp of FIG. 1, shown the movable member and the first transparent plate in a contraction state.
Figure 8:
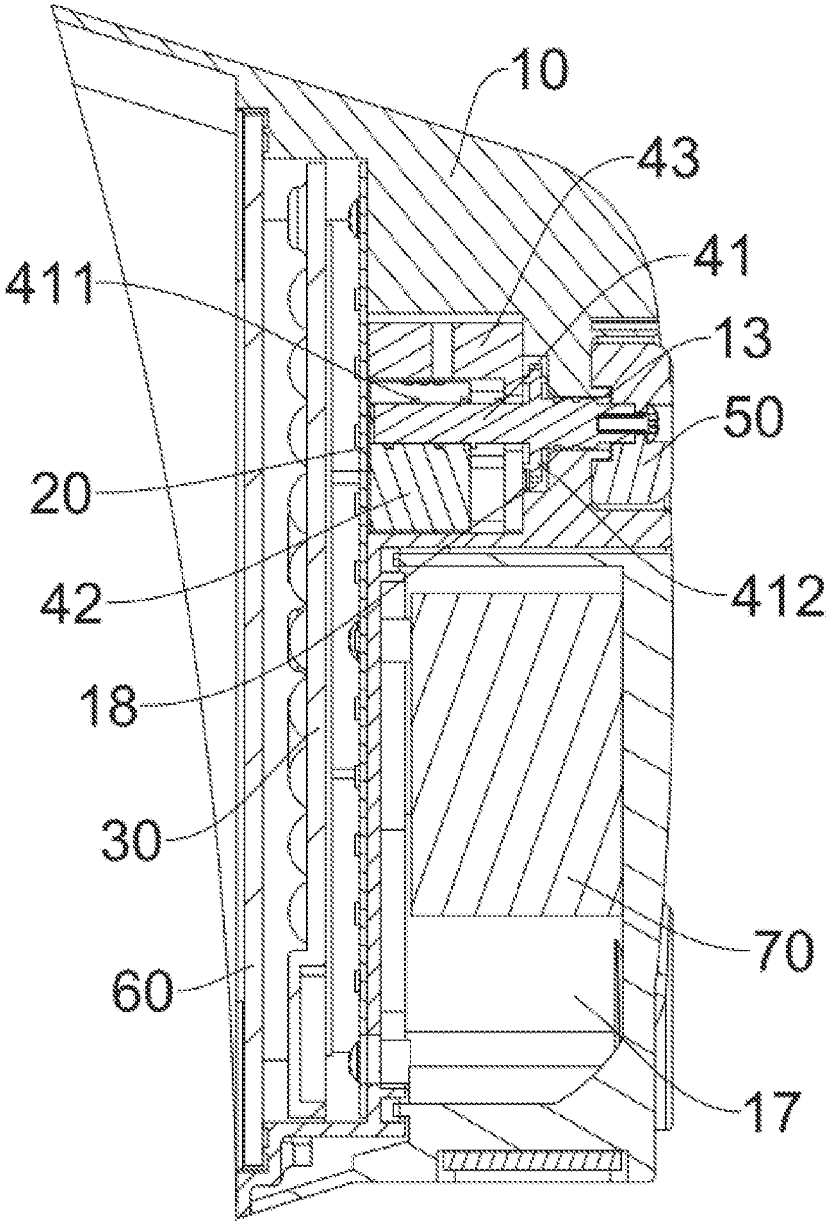
FIG. 8 is similar to FIG. 7, but shown the movable member and the first transparent plate in a stretch out state.
Figure 9:
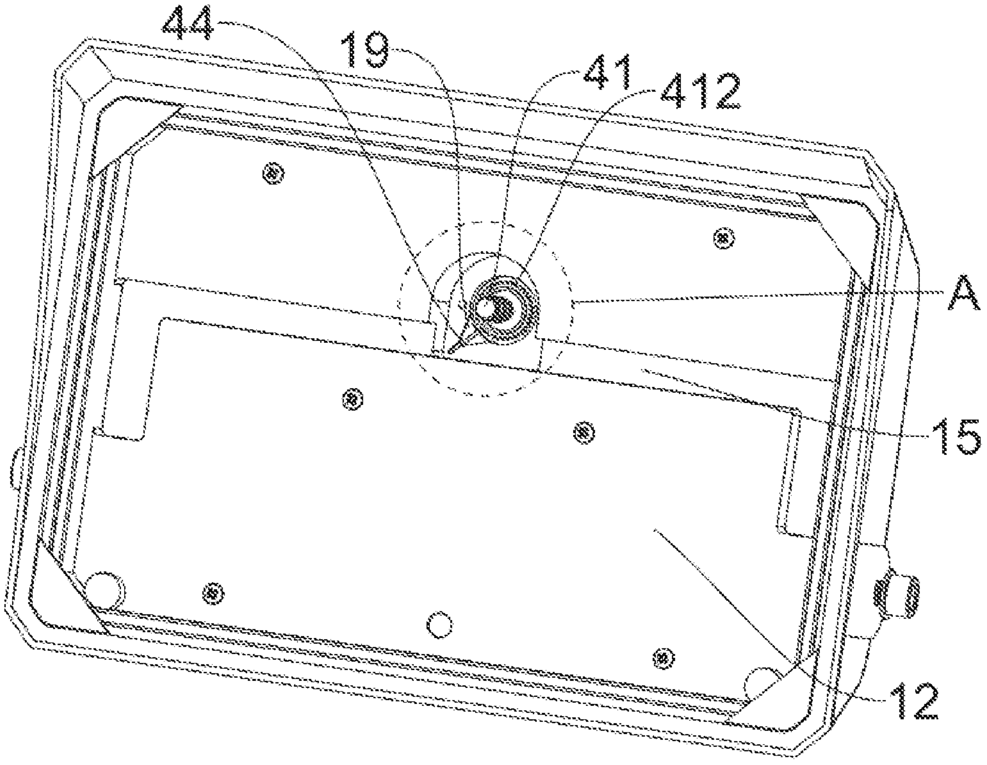
FIG. 9 is a partial schematic view of the LED lamp of FIG. 1.
Figure 10:
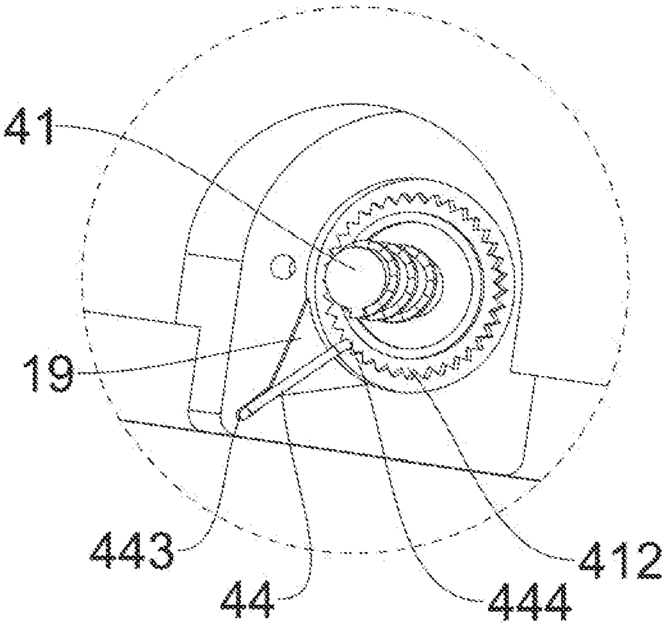
FIG. 10 is an enlarged view of a circle of FIG. 9.

Referring to FIGS. 1-10, an LED lamp in accordance with an embodiment of the present disclosure includes a heat sink 10, an LED light board 20, a first transparent plate 30 and a movable member 40. The heat sink 10 includes a first groove 12 arranged on a front surface 11 of the heat sink 10, the LED light board 20 fixed in the first groove 12, the first transparent plate 30 arranged on a side of an emitting surface 21 of the LED light board 20, that is, the first transparent plate 30 is arranged on an outer side of the LED light board 20. The movable member 40 is installed on the heat sink 10 and connected to the first transparent plate 30 by a transmission way. The movable member 40 is configured to drive the first transparent plate 30 to move relative to the LED light board 20, so as to adjust a distance between the LED light board 20 and the first transparent plate 30, and further adjust distribution directions of light emitted from the LED lamp, which can adjust distribution directions of the light without needing to disassemble the LED lamp, and have a simple and convenient operation thereof.

The movable member 40 includes a rotation shaft 41 and a moving member 42 connected to the rotation shaft 41 by a transmission way, the moving member 42 arranged on a side of the first transparent plate 30 near the first groove 12 and connected to the first transparent plate 30. The rotation shaft 41 defines a screw thread 411 and the moving member 42 defines a threaded hole 421, so that the rotation shaft 41 is inserted into the moving member 42 to drive the moving member 42 to stretch out and draw back by engaging the screw thread 411 with the threaded hole 421. During operation, the rotation shaft 41 rotates to drive the moving member 42 to move along a direction perpendicular to the LED light board 20. Because the moving member 42 is connected to the first transparent plate 30, the moving member 42 will drive the first transparent plate 30 to move along the direction perpendicular to the LED light board 20 to adjust the distance between the LED light board 20 and the first transparent plate 30, so as to adjust distributions of light emitted from the LED light board 20.

The heat sink 10 defines a shaft hole 13, the rotation shaft 41 passing through the shaft hole 13 and extending out of the heat sink 10 so that the rotation shaft 41 can be rotated externally. Specifically, the shaft hole 13 is provided on a back surface 14 of the heat sink 10 and passes through the heat sink 10, to connect with the interior of the first groove 12, so that the rotation shaft 41 can be connected to the moving member 42.

In some embodiments of the present disclosure, the LED lamp includes a knob 50 connected to a part 413 of the rotation shaft 41 that extends out of the heat sink 10, so that the knob 50 is provided that it is convenient for users to manually rotate the rotation shaft 41. It should be noted that in some embodiments, the knob 50 can be omitted, for example, a hexagonal nut (it can be an internal or external hexagon) is set on the part 413 where the rotation shaft 41 extends out of the heat sink 10, and a hexagonal wrench is provided for turning the rotation shaft 41 to implement the above purpose.

The heat sink 10 defines a second groove 15 that is formed that a first bottom wall 121 of the first groove 12 is recessed towards the back surface 14 of the heat sink 10, the moving member 42 movably installed in the second groove 15.

The movable member 40 further includes a fixing member 43 and the heat sink 10 includes a third groove 16 that is formed that the first bottom wall 121 of the first groove 12 is recessed towards the back surface 14 of the heat sink 10. The third groove 16 is connected to the second groove 15, the fixing member 43 is installed in the third groove 16, and the rotation shaft 41 passes through the fixing member 43 and penetrates into the moving member 42.

The fixing member 43 includes a guiding groove 431, the moving member 42 includes a guiding portion 423 movably arranged inside the guiding groove 431, and a connecting arm 422 connected to the guiding portion 423. The threaded hole 421 is arranged on the guiding portion 423, and the first transparent plate 30 is installed on the connecting arm 422. The rotation shaft 41 drives the guiding portion 423 to slide in the guiding groove 431, and then both the connecting arm 422 and the first transparent plate 30 are followed to move along the direction perpendicular to the LED light board 20, so as to adjust distributions of light emitted from the LED light board 20.

The connecting arm 422 is a U-shaped structure and includes a horizontal portion 4221 and two vertical portions 4222 opposite to each other, the first transparent plate 30 installed on the two vertical portions 4222. It can be understood that the second groove 15 is a U-shaped structure that is matched with the connecting arm 422. A thickness of the horizontal portion 4221 is smaller than a thickness of each of the two vertical portions 4222, a depth of the second groove 15 is greater than the thickness of the horizontal portion 4221, and when the moving member 42 moves, the horizontal portion 4221 moves within the second groove 15. That is, the horizontal portion 4221 does not extend beyond the second groove 15 when the horizontal portion 4221 moves. Because the LED light board 20 is arranged in the second groove 15, the thickness of the horizontal portion 4221 and the depth of the second groove 15 can be designed to ensure that the horizontal portion 4221 moves within the second groove 15, rather than protruding beyond the second groove 15. In an embodiment of the present disclosure, a length of the LED light board 20 is less than a distance between the two vertical portions 4222, and a length of the first transparent plate 30 is greater than the length of the LED light board 20, so that the LED light board 20 is arranged between the two vertical portions 20, two sides of the first transparent plate 30 connected to the two vertical portions 4222, respectively. Because the first transparent plate 30 is arranged on the outer side of the LED light board 20, it is necessary to design the thickness of the vertical portion 4222 to be greater than the thickness of the horizontal portion 4221, so that the vertical portion 4222 extends out of the second groove 15 to connect to the first transparent plate 30. When the vertical portion 4222 moves along the direction perpendicular to the LED light board 20, the vertical portion 4222 is staggered from the LED light board 20, therefore, the distance between the two vertical portions 4222 is designed to be greater than the length of the LED light board 20, and the length of the first transparent plate 30 is also designed to be greater than the length of the LED light board 20, so that the vertical portion 4222 can be abutted against the first transparent plate 30, which can make the entire LED lamp more compact and reduce a volume of the LED lamp.

In an optical embodiment of the present disclosure, the LED lamp further includes a second transparent plate 60 arranged on a side of the first transparent plate 30 away from the LED light board 20, the first transparent plate 30 received in the first groove 12, and the second transparent plate 60 connected to the heat sink 10 and covering on the first groove 12. In this way, the second transparent plate 60 is provided to implement a sealing effect thereof, in order to increase sealing performance of the LED lamp, a sealing ring 80 is arranged between the second transparent plate 60 and the heat sink 10 to prevent external dust or rainwater from entering the first groove 12. In an embodiment of the present disclosure, the first transparent plate 30 is an optical lens, and the second transparent plate 60 is a flat plate, such as a glass flat plate.

The heat sink 10 further includes a receiving room 17 for receiving a power supply 70 therein, both the rotation shaft 41 and the shaft hole 13 arranged above the receiving room 17.

In an optical embodiment of the present disclosure, the movable member 40 further includes an elastic rod 44, and a gear portion 412 is arranged on the rotation shaft 41, one end 443 of the elastic rod 44 connected to the heat sink 10, and the other end 444 of the elastic rod 44 engaged with the gear portion 412. The gear portion 412 and the rotation shaft 41 are integrated with each other. When the rotation shaft 41 rotates, the gear portion 412 also rotates. After rotating the gear portion 412, the elastic rod 44 will move from a gear slot of the gear portion 412 to a next gear slot of the gear portion 412, in this way, users can hear sounds that the elastic rod 44 meshes with different gear slots, and a feel of rotating the rotation shaft 41 will also be greatly enhanced. The gear portion 412 that meshes with the elastic rod 44 is provided that a user's experience of adjusting the movable member 40 can be increased.

The heat sink 10 further includes a gear groove 18 that is formed that the second bottom wall 161 of the third groove 16 is recessed towards the back surface 14 of the heat sink 10, the gear portion 412 arranged in the gear groove 18. The heat sink 10 further includes a limiting groove 19 arranged on the second bottom wall 161 of the third groove 16 and connected to the gear groove 18. The elastic rod 44 is a U-shaped structure and includes a horizontal rod 441 and two vertical rods 442, two ends of the horizontal rod 441 respectively connected to a corresponding vertical rod 442 of the two vertical rods 442. One of the two vertical rods 442 is inserted into the limiting groove 19, and the other of the two vertical rods 442 extends into the gear groove 18 to mesh with the gear portion 412 within the gear groove 18. The limiting groove 19 is a funnel-shaped structure, and the vertical portion 4222 of the elastic rod 44 is arranged inside the limiting groove 19 to limit a failure of the elastic rod 44 due to excessive deformation.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED lamp comprising:

a heat sink defining a first groove arranged on a front surface thereof;

an LED light board fixed in the first groove;

a first transparent plate arranged on a side of an emitting surface of the LED light board; and wherein the LED lamp further comprises a movable member installed on the heat sink and connected to the first transparent plate by a transmission way, the movable member configured to drive the first transparent plate to move relative to the LED light board, so as to adjust a distance between the LED light board and the first transparent plate; and wherein the movable member comprises a rotation shaft and a moving member connected to the rotation shaft by a transmission way, the moving member arranged on a side of the first transparent plate near the first groove and connected to the first transparent plate; wherein the rotation shaft defines a screw thread and the moving member defines a threaded hole, so that the rotation shaft is inserted into the moving member to drive the moving member to stretch out and draw back by engaging the screw thread with the threaded hole; and wherein the heat sink defines a shaft hole, the rotation shaft passing through the shaft hole and extending out of the heat sink so that the rotation shaft can be rotated externally.

2. The LED lamp as claimed in claim 1, wherein the LED lamp further comprises a knob connected to a part of the rotation shaft that extends out of the heat sink.

3. The LED lamp as claimed in claim 1, wherein the movable member further comprises an elastic rod, and a gear portion is arranged on the rotation shaft, one end of the elastic rod connected to the heat sink, and the other end of the elastic rod engaged with the gear portion.

4. The LED lamp as claimed in claim 3, wherein the heat sink defines a second groove that is formed that a first bottom wall of the first groove is recessed towards a back surface of the heat sink, the moving member movably installed in the second groove.

5. The LED lamp as claimed in claim 4, wherein the movable member further comprises a fixing member, and the heat sink comprises a third groove that is formed that the first bottom wall of the first groove is recessed towards the back surface of the heat sink; the fixing member installed in the third groove, and the rotation shaft passing through the fixing member and penetrating into the moving member.

6. The LED lamp as claimed in claim 5, wherein the heat sink further comprises a gear groove that is formed that a second bottom wall of the third groove is recessed towards the back surface of the heat sink, the gear portion arranged in the gear groove.

7. The LED lamp as claimed in claim 6, wherein the heat sink further comprises a limiting groove arranged on the second bottom wall of the third groove and connected to the gear groove; wherein the elastic rod is a U-shaped structure and comprises a horizontal rod and two vertical rods, one of the two vertical rods inserted into the limiting groove, and the other of the two vertical rods extending into the gear groove to mesh with the gear portion within the gear groove.

8. The LED lamp as claimed in claim 5, wherein the fixing member comprises a guiding groove, and the moving member comprises a guiding portion movably arranged inside the guiding groove, and a connecting arm connected to the guiding portion, the threaded hole arranged on the guiding portion, the first transparent plate installed on the connecting arm; wherein the rotation shaft drives the guiding portion to slide in the guiding groove, and then both the connecting arm and the first transparent plate are followed to move.

9. The LED lamp as claimed in claim 8, wherein the connecting arm is a U-shaped structure and comprises a horizontal portion and two vertical portions opposite to each other, the first transparent plate installed on the two vertical portions.

10. The LED lamp as claimed in claim 9, wherein a thickness of the horizontal portion is smaller than a thickness of each of the two vertical portions; wherein a depth of the second groove is greater than the thickness of the horizontal portion, and when the moving member moves, the horizontal portion moves within the second groove.

11. The LED lamp as claimed in claim 5, wherein a length of the LED light board is less than a distance between the two vertical portions, and a length of the first transparent plate is greater than the length of the LED light board, so that the LED light board is arranged between the two vertical portions, two sides of the first transparent plate connected to the two vertical portions, respectively.

12. The LED lamp as claimed in claim 1, wherein the LED lamp further comprises a second transparent plate arranged on a side of the first transparent plate away from the LED light board, the first transparent plate installed in the first groove, and the second transparent plate connected to the heat sink and covering on the first groove.

13. The LED lamp as claimed in claim 1, wherein the heat sink further comprises a receiving room for receiving a power supply therein, both the rotation shaft and the shaft hole arranged above the receiving room.

* * * * *